US 7,952,748 B2

(12) United States Patent
Voltz et al.

(10) Patent No.: US 7,952,748 B2
(45) Date of Patent: May 31, 2011

(54) DISPLAY DEVICE OUTPUT ADJUSTMENT SYSTEM AND METHOD

(75) Inventors: Christopher D. Voltz, Spring, TX (US); John W. Frederick, Spring, TX (US); Louis E. Leclerc, Houston, TX (US); Clinton B. Yearwood, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1226 days.

(21) Appl. No.: 11/585,609

(22) Filed: Oct. 24, 2006

(65) Prior Publication Data
US 2008/0144051 A1 Jun. 19, 2008

(51) Int. Cl.
*G06F 15/00* (2006.01)
*G09G 1/06* (2006.01)

(52) U.S. Cl. .......................................... 358/1.2; 345/11

(58) Field of Classification Search .................. 358/1.2, 358/1.18, 1.1, 1.5, 506, 1.13, 3.09, 300, 3.13, 358/296, 3.07, 448, 1.8; 382/299, 298; 348/581, 554, 655, 190, 511; 400/102; 345/594, 904, 11, 24, 660, 902; 715/823, 785, 810, 866; 701/1, 29, 36
See application file for complete search history.

(56) References Cited

U.S. PATENT DOCUMENTS

| | | | |
|---|---|---|---|
| 5,477,241 A * | 12/1995 | Higgins et al. | 345/661 |
| 5,650,857 A | 7/1997 | Cole et al. | |
| 6,061,048 A | 5/2000 | Choi | |
| 6,169,535 B1 | 1/2001 | Lee | |
| 6,359,389 B1 | 3/2002 | Medina et al. | |
| 2003/0090592 A1 * | 5/2003 | Callway et al. | 348/581 |

* cited by examiner

*Primary Examiner* — Saeid Ebrahimi Dehkordy

(57) ABSTRACT

A display device output adjustment system comprises an electronic device having a visual adjustment module configured to automatically adjust a size of visual content displayed on a display device coupled to the electronic device based on a comparison between at least one characteristic of the display device and a desired output value.

21 Claims, 2 Drawing Sheets

DISPLAY DEVICE OUTPUT ADJUSTMENT SYSTEM AND METHOD

BACKGROUND

Display devices are manufactured having different screen sizes and/or resolutions. As a result, displayed visual content (e.g., text, icons, pictures, etc.) is rendered at different dots-per-inch (DPI) values. For example, a typical 15-inch flat panel liquid crystal display (LCD) comprises a native resolution (i.e., the maximum resolution for a fixed resolution display (e.g., plasma displays, LCD displays, displays utilizing digital light processing, etc.)) of 1024×768 with a resulting DPI of 85×85. A 17-inch flat panel LCD device comprises a native resolution of 1280×1024 resulting in a DPI of 94×100. A 20-inch flat panel LCD comprises a native resolution of 1600×1200 and has a DPI of approximately 100× 100. Thus, the visual content on display screens varies in size and clarity when DPI values surpass certain thresholds, such as, for example, 85 DPI. These DPI differences make readable content on one display screen unreadable on a differently-sized display screen. Some operating systems provide an option to enable users to adjust the DPI settings and/or size of the visual content in the operating system; however, such options are difficult to access and, in many instances, do not provide suitable setting selections/choices.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
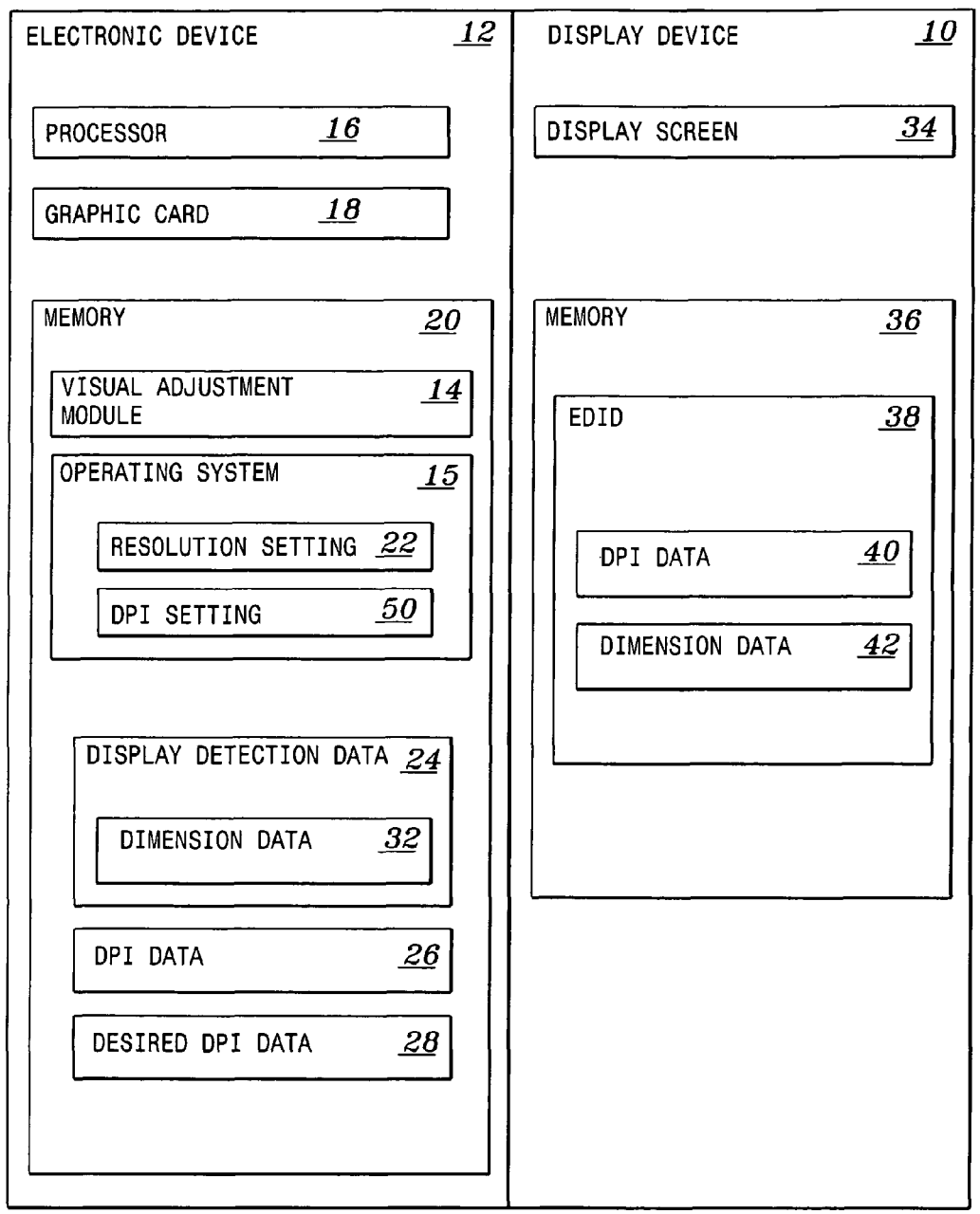
FIG. 1 is a block diagram illustrating an embodiment of a display device output adjustment system.
Figure 2:
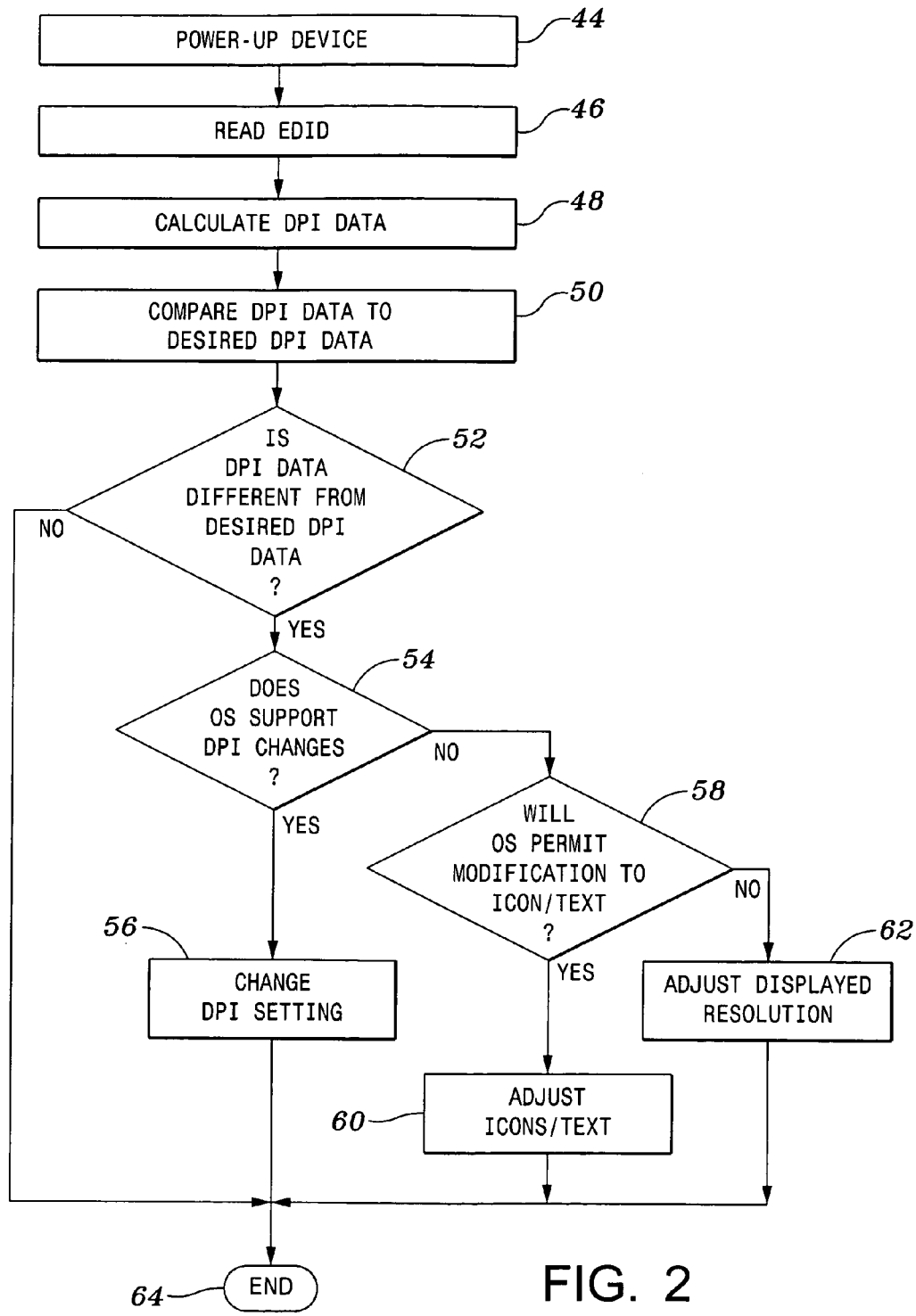
FIG. 2 is a flow diagram illustrating an embodiment of the display device output adjustment method.

The preferred embodiments of the present invention and the advantages thereof are best understood by referring to FIGS. 1 and 2 of the drawings, like numerals being used for like and corresponding parts of the various drawings.

FIG. 1 is a block diagram illustrating an embodiment of a display device output adjustment system 8. In the embodiment illustrated in FIG. 1, system 8 comprises a display device 10 communicatively coupled to an electronic device 12. In the embodiment illustrated in FIG. 1, display device 10 comprises a fixed resolution (i.e., a fixed number of pixels) display device such as a liquid crystal display (LCD); however, it should be understood that display device 10 may comprise other types of fixed resolution display devices such as, for example, a plasma display or a digital light processing (DLP) display device or any other type of display device (e.g., display devices other than fixed resolution displays). Electronic device 12 may comprise any type of computing or image content processing system such as, but not limited to, a desktop computer, laptop or notebook computer, server, television system, gaming device, etc. According to some embodiments, display device 10 and electronic device 12 comprise separate and/or independent devices that are connectable via a wired or wireless communication medium; however, it should be understood that display device 10 and electronic device 12 may be otherwise configured (e.g., integrated into a single device).

In FIG. 1, electronic device 12 comprises a processor 16, a graphic card 18 for sending image and/or graphical data to display device 10, and a memory 20. In FIG. 1, memory 20 comprises a visual adjustment module 14, an operating system 15, display detection data 24, DPI data 26 and a desired DPI data output value 28. Visual adjustment module 14 and/or operating system 15 may comprise hardware, software, firmware, or a combination thereof. In FIG. 1, visual adjustment module 14 and operating system 15 are illustrated as being stored in memory 20 so as to be accessible and/or executable by processor 16. However, it should be understood that visual adjustment module 14 and/or operating system 15 may be otherwise stored, even remotely.

Visual adjustment module 14 is used to automatically adjust (e.g., without intervention from a user of electronic device 12/display device 10) the display of visual content (e.g., text, icons, pictures, etc.) to a predetermined/preferred size on display device 10 based on a comparison of at least one characteristic of display device 10 (e.g., the dots-per-inch (DPI) value of the display device 10 based on an operating system resolution setting 22 (e.g., the resolution that the operating system drives the display device 10, such as for example, a native resolution of the display device, a user-selected and/or preprogrammed resolution value) and the display screen dimensions) with a desired DPI value. For purposes herein, a "native resolution" of a display device is the resolution for a fixed resolution display device as defined by a fixed number of pixels of the display device (e.g., plasma displays, LCD display, displays utilizing digital light processing, etc.) and a DPI value is a degree or ratio of resolution of screen images expressed in terms of the number of displayed dots or pixels per linear inch. Thus for example, a typical 15-inch fixed resolution display running at its native resolution (e.g. 1024×768) may comprise a DPI value of 85 and a 20-inch fixed resolution display running at its native resolution (e.g., 1600×1200) may comprise a DPI value of 100. Because the native resolutions for different display devices 10 may vary, visual content rendered by graphic card 18 will be differently displayed on display devices 10 having different native resolutions. Thus, visual content displayed on a 15-inch display may be rendered much smaller and sometimes unreadable on a 20-inch display. Embodiments of visual adjustment module 14 automatically adjust a DPI value for rendering the visual content to enable operating system 15 to automatically adjust the size of visual content displayed on the particular display device 10 (e.g., by automatically changing a DPI setting 30 of operating system 15). Thus, embodiments of visual adjustment module 14 automatically adjust a DPI value for rendering visual content in response to different display devices 10 being coupled to electronic device 12 (e.g., in response to a new or different display device 10 being coupled to electronic device 12, visual adjustment module 14 automatically adjusts a DPI value for rendering visual content on the new/different display device 10 without the need for user action).

In the embodiment illustrated in FIG. 1, display detection data 24 comprises information associated with data acquired by electronic device 12 pertaining to characteristics of display device 10. In FIG. 1, display detection data 24 comprises dimension data 32 (e.g., the physical dimensions (length and width values) of a display screen 34 of display device 10). DPI data 26 comprises the calculated or effective DPI of a particular display device 10 based on display detection data 24 (e.g., length and width values of display screen 34) and the resolution setting 22 of operating system 15. Desired DPI data 28 comprises information associated with known and/or predetermined values that are used to evaluate DPI data 26 to determine whether the visual content destined for a particular display device 10 should be adjusted/modified to enhance and/or otherwise provide a better appearance thereof. For example, in some embodiments, desired DPI data 28 comprises known or predetermined value(s) corresponding to a preferred DPI setting for different sizes of display screens 34. According to some embodiments, desired DPI data 28 comprises a value of 85 DPI (e.g., a preferred DPI setting to enable users to comfortably view visual content such as text, graphics and/or any other information on display devices 10 of differing sizes, such as for example, a 15-inch LCD panel, a 17-inch LCD panel or a 20-inch LCD panel). It should be understood that DPI values may be referred to a length and height value (e.g., 85×85, 94×100, etc.) or a single length value (e.g., 85 dpi) in the event the length and height values are identical.

In the embodiment illustrated in FIG. 1, display device 10 comprises a memory 36 having extended display identification data 38 (EDID). In the embodiment illustrated in FIG. 1, EDID 38 comprises screen size or dimension data 42 (e.g., the physical dimensions (length and width values) of display screen 34 of display device 10). It should be understood that EDID 38 may also comprise other types of information (e.g., a native resolution for display device 10, a preferred refresh rate for display device 10, etc.). In some embodiments, EDID 38 comprises DPI data 40 comprising the DPI value of display device 10 at its native resolution (e.g., based on length and width values of display screen 34) such that DPI data 40 is retrieved and/or otherwise obtained by electronic device 12 and stored therein as DPI data 26. According to some embodiments, EDID 38 is retrieved by electronic device 10 via a display data channel (DDC) (e.g., during a start-up or initialization process via a video basic input/output system or otherwise) and is stored in one or more registries in memory 20 or elsewhere so as to be available to visual adjustment module 14. For example, in the embodiment illustrated in FIG. 1, EDID 38 is stored in memory 20 as display detection data 24.

In operation, visual adjustment module 14 compares desired DPI data 28 to DPI data 26 to determine whether adjustment of a DPI setting 30 of operating system 15 is desired to facilitate an adjustment of the size of visual content on display screen 34 to provide increased and/or preferred viewing quality thereof (e.g., proportionately sized visual content in relation to the size of display screen 34 to enable ease of viewing). If DPI data 26 is greater than or less than a predetermined value stored as desired DPI data 28, embodiments of visual adjustment module 14 transmit and/or otherwise generate a function call to a standard application program interface (API) to automatically adjust DPI setting 30 of operating system 15 to enable graphic card 18 to produce or render visual content at a desired size on display screen 34. For example, a 17-inch flat panel display screen 34 operating at its 1280×1024 native resolution comprises a DPI value of 94. With an increased DPI value (94 DPI versus a preferred 85 DPI), the graphical content displayed on display screen 34 decreases in size since graphical content is rendered by number of pixels. Accordingly, in operation, visual adjustment module 14 compares DPI data 26 (e.g. 94 DPI) to desired DPI data 28 (e.g., 85 DPI) and determines that DPI data 26 is greater than desired DPI data 28. Accordingly, visual adjustment module 14 transmits and/or otherwise generates a function call to a standard API to automatically adjust DPI setting 30 of operating system 15 to the value stored as desired DPI data 28 (e.g., 85), thereby increasing the size of the visual content displayed on display device 10.

According to some embodiments, if a particular type or version of operating system 15 prohibits adjustments to DPI setting 30 (e.g., either automatically or manually), embodiments of visual adjustment module 14 transmit and/or otherwise generate a function call to a standard API to automatically adjust the size of the visual content displayed on display screen 34 such as, for example, automatically adjusting the sizes of text, fonts, icons, etc., that are displayed on display screen 34. Likewise, if a particular type or version of operating system 15 prohibits adjustments to the size of the visual content displayed on display screen 34, embodiments of visual adjustment module 14 automatically adjust the resolution for display screen 34.

In the embodiment illustrated in FIG. 1, visual adjustment module 14 compares desired DPI data 28 to DPI data 26 to determine whether adjustment of DPI setting 30 is necessary each time electronic device 10 is powered and/or booted. Furthermore, in instances in which a new display device 12 is connected to electronic device 10, visual adjustment module 14 may be configured to automatically compare desired DPI data 28 to DPI data 26 to determine whether adjustment of DPI setting 30 is necessary. According to some embodiments, desired DPI data 28 may be user-adjusted to any other desired DPI value such that the new DPI value is used for future comparisons by visual adjustment module 14.

FIG. 2 is a flow diagram illustrating an embodiment of the display device output adjustment method. In the embodiment illustrated in FIG. 2, the method begins at block 44, where power is supplied to electronic device 12. At block 46, processor 16 reads EDID 38 of display device 10 (e.g., via a video basic input/output system or otherwise) to identify at least dimension data 42 associated with display device 10 and stores EDID 38 as display detection data 24. For example, at block 46, dimension data 42 of display screen 34 is read by electronic device 12 and stored in memory 20 as dimension data 32. At block 48, visual adjustment module 14 calculates the DPI value of display device 10 based on resolution setting 22 and dimension data 32 and stores the DPI value as DPI data 26. At block 50, visual adjustment module 14 compares the DPI data 26 to desired DPI data 28.

At decision block 52, if visual adjustment module 14 determines that DPI data 26 is a different value from the value of desired DPI data 28 (e.g. DPI data 26 is greater or less than the value stored as desired DPI data 28), the method proceeds to decision block 54 where it is determined whether operating system 15 supports adjustments to DPI setting 30. If at decision block 54 it is determined that operating system 15 supports adjustment to DPI setting 30, the method proceeds to block 56, where visual adjustment module 14 adjusts DPI setting 30 of operating system 15 to a value equal to (i.e., equal to or approximately equal to) the value of desired DPI data 28. For example, if DPI data 26 is determined to be 100 DPI and desired DPI data 28 is 85 DPI, then embodiments of visual adjustment module 14 will change DPI setting 30 of operating system 15 to a value equal to 85 DPI. Accordingly, if DPI data 26 is calculated at a level less than 85 DPI (e.g., 75 DPI), embodiments of visual adjustment module 14 automatically adjust DPI setting 30 to a value equal to 85 DPI.

If at decision block 54 it is determined that operating system 15 does not support modifications to DPI setting 30, the method proceeds to decision block 58, where a determination is made whether operating system 15 permits modifications to the sizes of text and graphics displayed on display screen 34. If operating system 15 supports size modifications, visual adjustment module 14 automatically modifies the sizes of the text and graphics at block 60. If at decision block 58 it is determined that operating system 15 does not support modifications of the text sizes and visual graphics, the method proceeds to block 62, where visual adjustment module 14 automatically modifies the resolution of display screen 62. At decision block 52, if it is determined that DPI data 26 is the same (i.e., the same or substantially the same) as the value stored as desired DPI data 28, the method ends at block 64 with no modification to the text and/or graphics on display screen 34.

Thus, embodiments of system 8 automatically adjust the display of visual content on display device 10 based on a detected characteristic of display device 10 to provide a preferred size of displayed visual content on display device 10. It should be understood that in the described method, certain functions may be omitted, accomplished in a sequence different from that depicted in FIG. 2, or simultaneously performed. Also, it should be understood that the method depicted in FIG. 2 may be altered to encompass any of the other features or aspects as described elsewhere in the specification. Further, embodiments may be implemented in software and can be adapted to run on different platforms and operating systems. In particular, functions implemented by visual adjustment module 14, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium.

What is claimed is:

1. A display device output adjustment system, comprising:
    an electronic device to obtain at least one characteristic from a display device and to calculate a value based on said at least on characteristic;
    wherein said electronic device has a visual adjustment module configured to automatically adjust a size of visual content to be displayed on the display device based on a comparison between calculated value and a desired output value.

2. The system of claim 1, wherein the at least one characteristic comprises a resolution setting of the display device.

3. The system of claim 1, wherein the at least one characteristic comprises a dimension of a display screen of the display device.

4. The system of claim 1, wherein the at least one characteristic comprises a dots-per-inch (DPI) value associated with the display device.

5. The system of claim 1, wherein the desired output value comprises a preferred dots-per-inch (DPI) value.

6. The system of claim 1, wherein the electronic device obtains extended display identification data (EDID) from the display device, said EDID comprises said at least one characteristic.

7. The system of claim 1, wherein the calculated value comprises a dots-per-inch value (DPI) value.

8. The system of claim 7, wherein the visual adjustment module is configured to adjust a DPI setting of an operating system if the DPI value is different from the desired output value.

9. The system of claim 1, wherein the visual adjustment module is configured to automatically adjust the size of visual content to the desired output value in response to a different display device being coupled to the electronic device.

10. A display device output adjustment method, comprising:
    obtaining data from a display device, said data indicative of at least one characteristic of the display device;
    calculating a value based on said data obtained from the display device; and
    automatically adjusting a size of visual content displayed on the display device by an electronic device coupled to the display device based on a comparison between the calculated value and a desired output value.

11. The method of claim 10, wherein said data obtained from the display device comprises at least a resolution setting of the display device.

12. The method of claim 10, wherein said data obtained from the display device comprises at least a dimensional characteristic of a display screen of the display device.

13. The method of claim 10, further comprising using an operating system resolution setting and a dimension of a display screen of the display device to determine the at least one characteristic.

14. The method of claim 10, wherein said calculated value comprises a dot-per-inch (DPI) value for the display device.

15. The method of claim 10, wherein the data obtained from the display device comprises extended display identification data (EDID) associated with the display device.

16. The method of claim 10, further comprising adjusting a DPI setting of an operating system if the calculated value is different from the desired output value.

17. A display device output adjustment system, comprising:
    means for obtaining data from a display means, said data indicative of at least one characteristic of the display means;
    means for calculating a value based on said data obtained from the display means; and
    means for automatically adjusting a size of visual content displayed on the display means by an electronic means coupled to the display means based on a comparison between the calculated value and a desired output value.

18. The system of claim 17, wherein the at least one characteristic comprises an operating system resolution setting of the display means.

19. The system of claim 17, wherein the desired output value comprises a dots-per-inch (DPI) value.

20. The system of claim 17, wherein the calculated value comprises a dots-per-inch (DPI) value of a screen means of the display means based on the at least one characteristic and wherein the adjusting means is configured to adjust a DPI setting of an operating system means if the DPI value is different than the desired output value.

21. A computer-readable medium having stored thereon an instruction set to be executed, the instruction set, when executed by a processor, causes the processor to:
    obtain data from a display device, said data indicative of at least one characteristic of the display device;
    calculate a value based on said data obtained from the display device; and
    automatically adjust a size of visual content displayed on the display device by an electronic device coupled to the display device based on a comparison between the calculated value and a desired output value.

* * * * *

UNITED STATES PATENT AND TRADEMARK OFFICE
CERTIFICATE OF CORRECTION

PATENT NO.         : 7,952,748 B2                                    Page 1 of 1
APPLICATION NO.    : 11/585609
DATED              : May 31, 2011
INVENTOR(S)        : Christopher D. Voltz et al.

It is certified that error appears in the above-identified patent and that said Letters Patent is hereby corrected as shown below:

In column 5, line 60, in Claim 7, after "inch" delete "value".

In column 6, line 24, in Claim 14, delete "dot-per-inch" and insert -- dots-per-inch --, therefor.

Signed and Sealed this
Third Day of January, 2012

David J. Kappos
*Director of the United States Patent and Trademark Office*